(No Model.)

J. F. STEWARD.
MOWING MACHINE PITMAN.

No. 463,341. Patented Nov. 17, 1891.

Witnesses.
Arthur Johnson
C. C. Meade

Inventor.
John F. Steward

UNITED STATES PATENT OFFICE.

JOHN F. STEWARD, OF CHICAGO, ILLINOIS.

MOWING-MACHINE PITMAN.

SPECIFICATION forming part of Letters Patent No. 463,341, dated November 17, 1891.

Application filed February 28, 1891. Serial No. 383,186. (No model.)

*To all whom it may concern:*

Be it known that I, JOHN F. STEWARD, of Chicago, in the county of Cook and State of Illinois, have invented certain new and useful Improvements in Mowing-Machine Pitmen, of which the following is a full description, reference being had to the accompanying drawings, in which—

Figure 1:
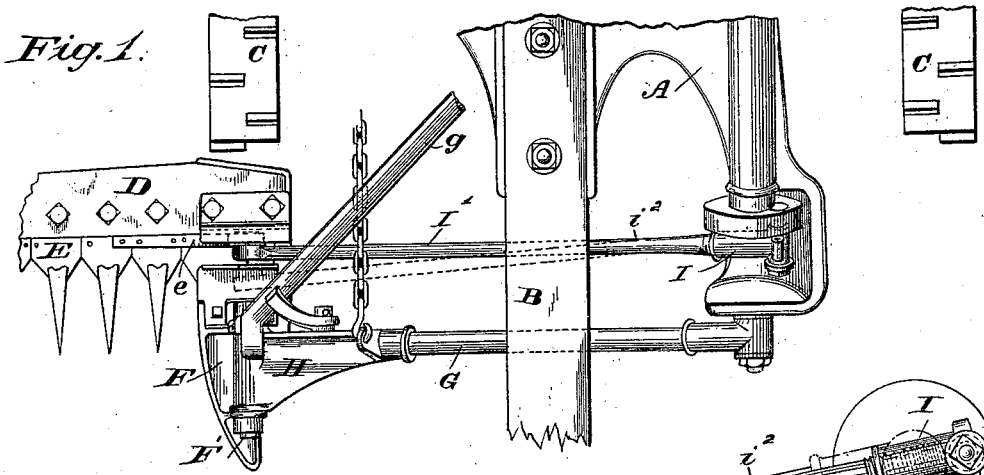
Figure 2:
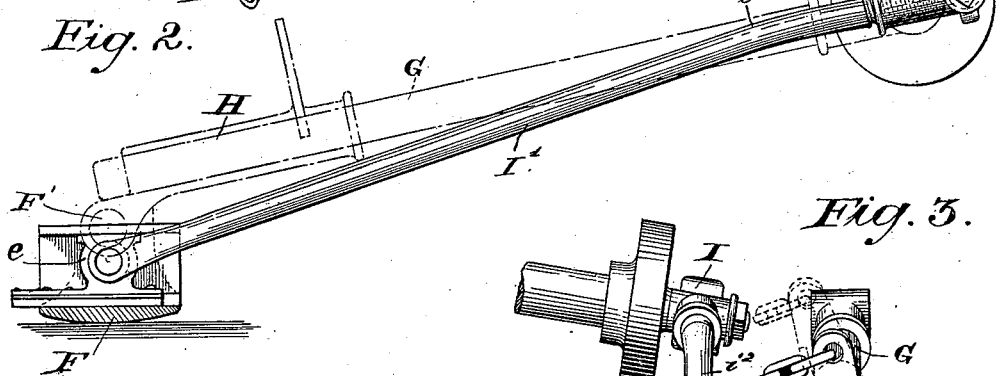
Figure 3:
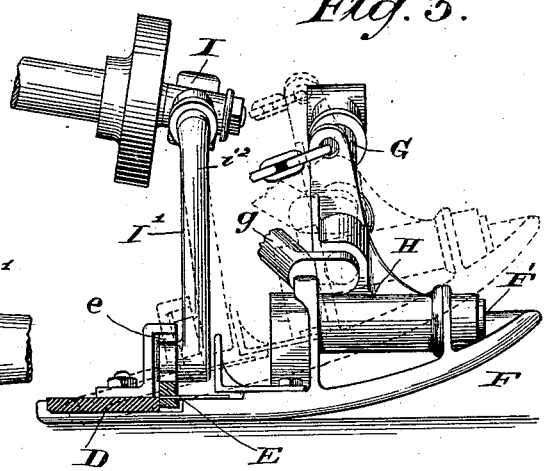
Figure 4:
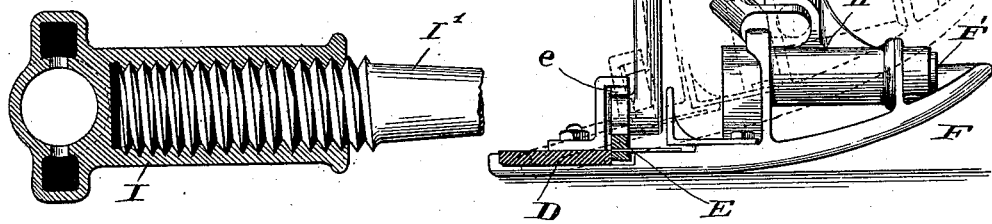
Figure 5:
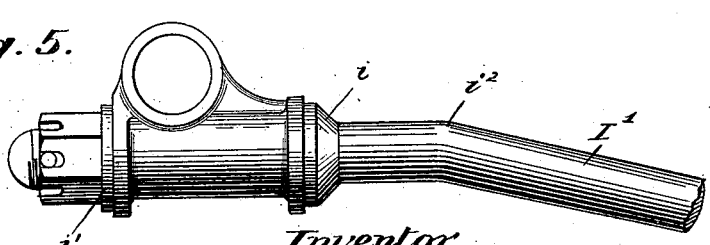

Figure 1 is a plan view showing the hinge-bar, a portion of the cutting apparatus, and a portion of the main gearing, the said parts illustrating enough of a mower to convey a correct idea of what I have produced and claim as new. Fig. 2 is a front view showing the crank-wheel, pitman, shoe, and a portion of the knife in proper positions relative to the hinge-bar or coupling-frame, which is shown in dotted lines. Fig. 3 is a grain-side elevation of substantially the same parts as shown in Fig. 1, designed to illustrate the changes in position when the cutting apparatus is changed by tilting. Fig. 4 is a detail of the upper end of the pitman. Fig. 5 is a modification embodying, however, but the main feature of my invention.

The object of my invention is to produce a pitman connection that may in the simplest manner possible serve the purpose of a universal joint at its end connected to the crank-wheel wrist and yet avoid the complications and particularly the defects of the universal joints heretofore used.

I have introduced Fig. 5 merely for the purpose of showing more than one way of accomplishing the main result attained, but shall draw my claims to conform more particularly to the specific construction shown in the other figures aside from the broader claims that find embodiment in each of the two forms.

A is the forward portion of the main frame of a mower.

B is the tongue; C, the wheels; D, the finger-bar; E, the knife having the knife-head $e$; F the shoe, and G the coupling-frame having the brace-like portion $g$.

Upon the forward portion of the coupling-frame G is the swivel-piece H, and to the latter, by means of the joint-pin F', is pivoted the shoe. The coupling-bar G has its lower end some distance above the shoe, and as the swivel-piece H is adapted to vibrate on G as an axis in tilting the cutting apparatus the latter parts are thrown to the position shown in dotted lines in Fig. 3.

It has been found difficult to get the hinge-bar or coupling-frame of a mower as low as might be desirable in order to make the pitman work well and yet high enough to serve other desirable purposes. With the cutting apparatus swiveled upon the front hinge-bar G the latter forms the axis of vibration in tilting, and as the cutting apparatus has its angle changed and is thrown forward by the tilting process the pitman must swing at its lower end and rock on an axis which I provide adjacent to the wrist-pin of the crank-wheel. I so shape the pitman that the axis upon which it must move at its lower end to conform to the movement of the cutting apparatus shall be parallel with the axis of tilt of the cutting apparatus, as I will now explain. I make a T-shaped box I and so connect the pitman I' thereto that the latter may rock freely within the pitman-box. In Fig. 4 it will be seen that I enlarge the end of the pitman and screw it deeply into a recess in the pitman-head, yet loosely enough to turn freely.

One or more oil-cups are provided. I show two in Fig. 4 for purposes hereinafter to be explained.

Turning to Fig. 2 it will be seen that I pass the pitman at its head end for a distance parallel with the axis of vibration of the cutting apparatus in tilting on the coupling-bar or equivalent axis of tilt, as shown in dotted lines, and then immediately give it a bend at $i^2$ that throws the outward end downward far enough to couple with the knife. It will be seen that by this bend, although the pitman and hinge-bar are not parallel this whole length, the said pitman and bar are substantially parallel for a distance at the pitman-head end. It may under some circumstances be considered preferable to have the pitman pass through the pitman-head, as in the modification shown in Fig. 5, in which case a shoulder $i$ is formed and the nut and collar $i'$ applied. The pitman-head is fitted to the crank-wrist in the usual manner. I prefer to thread the pitman into its head, so that the variations in manufacture of the coupling-frame can be compensated for. Each pitman should be adapted, by means which will permit of changes in length, to cause the sections of the knife to conform with the guards of the finger-bars—that is, "register" as it is sometimes termed.

In order to get sufficient resisting-surface to stand the shock of pull and thrust of the pitman, it is desirable to deeply thread the pitman and its box, and hence I produce threads somewhat coarse in pitch.

In order that the length of the pitman may be varied as little as possible, I provide an oil-cup both above and below the eye for the wrist, so that in adjustment the pitman box or head can be turned over, and thus vary the length of the pitman but one-half the pitch.

What I claim as my invention, and desire to secure by Letters Patent, is—

1. A pitman-head having an eye to receive the crank-wrist and an eye transverse thereto adapted to form an axis upon which the pitman may rock in the said pitman-head, the said pitman free to rock therein and provided with a bend at a point, as at $i^2$, which permits the knife end of the pitman to fall to its position and connecting with the knife-head, the axis of rocking movement in the pitman-head remaining substantially parallel with the axis of vibration of the cutting apparatus on its tilting center, substantially as described.

2. A pitman-head having an eye to receive the crank-wrist and an eye transverse thereto threaded to receive the pitman, the latter free to rock therein and provided with a bend which permits the knife end of the pitman to fall to its position and connect with the knife-head, the axis of rocking movement in the pitman-head remaining substantially parallel with the axis of vibration of the cutting apparatus on its tilting center, substantially as described.

JOHN F. STEWARD.

Witnesses:
ARTHUR JOHNSON,
A. L. UPTON.